US005480085A

United States Patent [19]

Smithe et al.

[11] Patent Number: 5,480,085

[45] Date of Patent: Jan. 2, 1996

[54] METHOD AND APPARATUS FOR CONTROLLING TENSION BETWEEN VARIABLE SPEED DRIVER ROLLERS

[75] Inventors: Eliot S. Smithe, Hollidaysburg; Michael P. Lambert; Jason H. Wilkinson, both of Altoona, all of Pa.

[73] Assignee: F. L. Smithe Machine Company, Inc., Duncansville, Pa.

[21] Appl. No.: 116,359

[22] Filed: Sep. 3, 1993

Related U.S. Application Data

[63] Continuation-in-part of Ser. No. 775,336, Oct. 11, 1991, Pat. No. 5,241,884.

[51] Int. Cl.[6] .......... B23Q 15/00

[52] U.S. Cl. .......... 226/44; 226/42; 226/118; 242/418.1

[58] Field of Search .......... 226/44, 113, 118, 226/42; 242/418, 418.1, 419, 419.1

[56] References Cited

U.S. PATENT DOCUMENTS

| | | | |
|---|---|---|---|
| 3,667,664 | 6/1972 | Schroeder | 226/30 |
| 4,561,581 | 12/1985 | Kelly | 226/113 |
| 4,775,086 | 10/1988 | Kataoka | 226/44 |
| 4,951,895 | 8/1990 | Hirai | 242/75.51 |

FOREIGN PATENT DOCUMENTS

| | | | |
|---|---|---|---|
| 2169928 | 7/1986 | United Kingdom | 242/418.1 |

*Primary Examiner*—Daniel P. Stodola
*Assistant Examiner*—Thomas E. Dunn
*Attorney, Agent, or Firm*—John M. Adams; Stanley J. Price, Jr.

[57] ABSTRACT

A continuous web of sheet material is fed through the nip of a first pair of driven pull rolls around a series of idler rollers and through the nip of a second pair of driven pull rolls. The pairs of pull rolls are selectively rotated to exert a desired tension on the web in a tension zone formed between the pairs of rolls. One pair of pull rolls operates as feed rolls to advance a preselected length of the web to a rotating cutter mechanism so that envelope blanks of a selected length are cut from the web for each revolution of the cutter mechanism. The feed rolls are operated by a servo-controlled motor responsive to an operator initiated signal to adjust the feed length without interrupting the feed of the web to the cutter mechanism. The second pair of pull rolls operates as tension rolls and is servo-motor controlled to maintain a preselected tension on the web fed to the cutter mechanism. The web in the tension zone is rotatably supported by idler rolls having load cells for generating a signal to a controller proportional to the tension applied to the web. Operator input through a keypad to the controller actuates the tension rolls at a gear ratio for generating a desired tension in the web. A deviation in the applied tension from the commanded tension actuates the servo-motor for the tension rolls to adjust the rotation thereof to restore the desired tension in the web.

10 Claims, 3 Drawing Sheets

METHOD AND APPARATUS FOR CONTROLLING TENSION BETWEEN VARIABLE SPEED DRIVER ROLLERS

CROSS REFERENCE TO RELATED APPLICATION

This application is a continuation-in-part of copending application Ser. No. 775,336 filed Oct. 11, 1991 and now U.S. Pat. No. 5,241,884 entitled "Apparatus for Changing the Length of Envelope Blanks cut From A Web".

BACKGROUND OF THE INVENTION

1. Field of the Invention

This invention relates to method and apparatus for controlling tension in a web and more particularly to method and apparatus for maintaining a preselected tension on a continuous web of sheet material fed through a machine for making envelope blanks from the web.

2. Description of the Prior Art

In an envelope machine, envelopes are formed by cutting envelope blanks from a continuous roll of web material. Pull rolls pull the web under tension from a reel at a preselected feed rate. The web is fed to a cutter station where discrete lengths of envelope blanks are cut from the web. The length of the envelope blanks is determined by the ratio between the number of cuts per minute and the rate at which the web is fed to the cutter station.

The conventional practice is to vary the length of the blanks cut from the web within certain limits depending on the nature of the envelope to be formed from the envelope blank. Once the blanks are formed, they are then fed on the envelope machine to subsequent stations at preselected time intervals to perform a number of other given operations on the envelope blank. For example, at the front end of the machine, the envelope blanks must be in proper position for a rotating cutter knife or a panel cutter to cut windows or panels in the blanks. Thereafter, the blanks must be in proper position when the bottom seal score is impressed on the blank. Each operation requires that the blanks be of uniform length and are continuously fed at a preselected speed. Adjustments in the web tension are also required to be made over a period of time when the machine components are exposed to wear and adjustments must be made to maintain a desired tension in the web.

A conventional envelope machine includes a drive shaft that rotates at a preselected speed, and the web material is conveyed from a supply roll at a preselected rate feed relative to rotation of the drive shaft. Web cutting apparatus cuts the web material at preselected intervals to form various parts of the envelope blank, such as a bottom flap, a closure flap, side flaps, and a body portion of each envelope blank.

A drive mechanism is connected to a main drive shaft of the machine and includes a driven output shaft rotated relative to the rotation of the main drive shaft. The output shaft is, in turn, drivingly connected to the web feeding apparatus. The web feeding apparatus is then driven at a predetermined ratio relative to the main drive shaft. With this arrangement, the drive mechanism is operable to change the rate of rotation of the output shaft relative to the fixed rate of rotation of the drive shaft. This permits an adjustment to be made in the length of the envelope blank cut from the web and accordingly permits a change in the configuration of the envelope blank so that, for example, the length of the bottom flap can be changed while the closure flap and the body portion of the envelope are maintained a fixed length.

It has been the conventional practice to provide adjustments in the length of the envelope blanks cut from the web by connecting the drive shaft through a change gear unit to the web feeding apparatus. A gear set is used for the desired length of cut. Each gear set corresponds to a different feed rate and length of cut. While a variation in the feed length is provided, the length of cut is in increments. Substantially, infinitely variable feed lengths are not available with gear sets.

The change in feed length using gear sets in combination with a variable transmission necessitates an interruption in the operation of the machine to change the setting. Once the setting is changed, trial runs must be performed to determine if the setting change produces the desired length of envelope blank cut from the web. If the length of the envelope blank should deviate from the required length, then adjustments to the setting are required. Overall, the process of changing gear sets to change the length of the envelope blank is a time consuming operation. Furthermore, it necessitates the maintenance of a substantial inventory of gear sets to provide a full range of envelope blank sizes. U.S. Pat. Nos. 2,696,255; 3,056,322 and 3,128,662 are examples of envelope machines that utilize gear sets to provide adjustments in the length of envelope blanks cut from a web.

In an effort to increase the efficiency in changing the length of envelope blank cut from the web variable speed transmissions have been utilized to connect the main drive shaft with the web feeding apparatus. U.S. Pat. No. 4,020,722 discloses a cutting machine for cutting sheets from a web of paper in which a differential gear and a gear box drivingly connect the drive shaft to the web feeing apparatus. With this arrangement, the web feeding apparatus is driven at a preselected speed within a range without changing gear sets. The desired sheet length is set by setting the gear box at a ratio that drives the feeding apparatus for a preselected length of cut. Electrical pulses indicate of the speed at which the web is driven by the gear box are fed to a control unit and compared with the set sheet length. The comparison is computed and a resultant signal is transmitted to the pull rolls to correct the speed at which the web is fed to the cutter station.

U.S. Pat. No. 4,136,591 discloses in an envelope making machine apparatus for changing the length of envelope blanks cut from a continuous roll of web material in which a variable speed drive mechanism is connected to the drive shaft and includes an output shaft drivingly connected to web feeding apparatus. With this arrangement, the web feeding apparatus is driven at a predetermined ratio relative to the speed of the drive shaft. The variable speed mechanism is operable to change the speed of the output shaft relative to the speed of the input shaft to change the length of the bottom flap of an envelope blank while maintaining the closure flap and the body portion of the envelope a fixed length.

Other approaches to cutting envelope blanks of different lengths from a continuous web in envelope machines are disclosed in U.S. Pat. Nos. 1,837,727 and 3,056,322. U.S. Pat. No. 4,125,044 discloses in an envelope machine, a pair of feed rolls connected by a variable speed transmission to a drive motor. Cutting knives are positioned between the rollers. The rotational speed of the knives is adjusted relative to one another by the variable speed transmission.

U.S. Pat. No. 4,429,603 discloses in an envelope forming machine, a plurality of transmissions for obtaining desired speed ratios in adjusting the length of an envelope blank severed from the web. The relative gear ratios of the transmissions determine the length of the blank to be cut from the web and the length can be adjusted through the transmissions.

U.S. Pat. No. 3,244,045 discloses an input roller which feeds a strip of paper fed from a roll. The roller is drivingly connected through a gear train to a driven input shaft. A change gear in the gear train is mounted on an adjustable arm. The position of the arm is varied to accommodate different size change gears to vary the speed of the roller.

While it is known to provide adjustments in the length of the blank cut from a continuous web in an envelope making machine by change gears and by variable speed transmissions that transmit drive from the main drive shaft to the web feeding apparatus, the known devices are limited in the extent to which adjustments can be made to the feed length and web tension. Specific lengths are provided for specific gear sets. The variable speed transmission provides a degree of infinite adjustment within a range of size but not outside the range.

Therefore, there is need to provide in an envelope making machine apparatus that provides substantially infinite adjustment to the length of the envelope blank cut from the web while including an automatic control of the web tension. The machine must permit adjustments to be made in the feed length and web tension while the machine is running to avoid the necessity of shutting down operation of the machine to determine if the envelope blanks being cut correspond to the correct length or to prevent slack or excessive tension in the web.

SUMMARY OF THE INVENTION

In accordance with the present invention there is provided apparatus for controlling the tension in a web advancing in a feed path that includes a machine frame supporting the web for movement in the feed path. A first pair of pull rolls is rotatably supported in the machine frame for engaging the web. First drive means rotate the first pair of pull rolls to advance the web in the feed path. A second pair of pull rolls is rotatably supported in spaced relation to the first pair of pull rolls in the machine frame for engaging the web. Second drive means rotate the second pair of pull rolls to apply tension on the web between the first and second drive means. Control means is electrically connected to the first and second drive means for adjusting the relative rotation of the first and second pair of pull rolls. Means for sensing the tension applied to the web in the feed path between the first and second drive means generates to the control means in input signal representative of the tension. Operator means is electrically connected to the control means for transmitting an input signal to the control means corresponding to an operator selected tension to be applied to the web in the feed path between the first and second drive means. The control means is responsive to the input signal received from the operator means. To compare the input signal received from the sensing means with the input signal received from the operator means to generate an output signal to a selected one of the first and second drive means to rotate a selected one of the first and second pull rolls at a preselected rate so that the tension applied to the web corresponds to the operator's selected tension.

Further in accordance with the present invention, there is provided a method for controlling the tension in an advancing web that includes the steps of supporting the web for movement in a feed path. The web is engaged between a first pair of pull rolls in the feed path. The first pair of pull rolls are rotated to advance the web in the feed path. The web is engaged between a second pair of pull rolls spaced from the first pair of pull rolls in the feed path. The second pair of pull rolls is rotated to apply tension on the web in the feed path between the first and second pair of pull rolls. The tension applied to the web in the feed path is sensed between the first and second pair of pull rolls. A tension is selected to be applied to the web in the feed path between the first and second pair of pull rolls. The tension applied to the web in the feed path is compared with selected tension to be applied to the web. The rotation of a selected one of the first and second pair of feed rolls is adjusted so that the tension applied to the web corresponds to the selected tension to be applied to the web.

Additionally, the present invention is directed to apparatus for changing the length of blanks cut from a continuous web of material that includes a machine frame. Cutter means is rotatably supported in a preselected angular position in the machine frame for severing the continuous web at preselected intervals to form blanks of a preselected length. Cutter drive means continuously rotates the cutter means at a preselected speed. The pull rolls are rotatably supported in the machine frame for feeding the web of material unwound from a roll to the cutter means at a preselected feed rate. Pull roll drive means continuously rotates the pull rolls at a preselected rotational velocity. Control means electrically connected to the pull roll drive means adjusts the rate of rotation of the pull rolls to maintain rotation of the pull rolls at a constant preselected feed rate corresponding to a preselected length of blank cut from a web where the length of a blank cut from a web is determined by the rate of rotation of the pull rolls. A first sensor is connected to the cutter means for generating input signals representative of the angular position of the rotating cutter means to the control means. A second sensor is connected to the pull roll drive means for generating an input signal representative of the rotational speed of the pull rolls to the control means. Operator means is electrically connected to the control means for transmitting an input signal to the control means corresponding to a selected length of blank to be cut from the web. The control means is responsive to the input signal received from the operator means to compare the input signal received from the first and second sensors with the input signal from the operator means to generate an output signal to the pull roll drive means to continuously rotate the pull rolls at a preselected speed so that upon rotation of the cutter means the web is cut at selected intervals while maintaining continuous feed of the web material to obtain the desired length of blank cut from the web.

Accordingly, a principal object of the present invention is to provide method and apparatus for maintaining a preselected tension on a web of sheet material fed continuously in a feed line.

A further object of the present invention is to provide in an envelope blank forming machine apparatus for controlling the tension applied to a web of stock material through a tension zone between a pair of driven feed rolls.

Another object of the present invention is to provide method and apparatus for sensing the tension applied to a continuous web of sheet material fed between a first and second pair of feed rolls so that in the event the tension in the web deviates from a preselected level the tension exerted on the web by either one of the pair of feed rolls is adjusted to maintain the desired tension.

These and other objects of the present invention will be more completely disclosed and described in the following specification, the accompanying drawings, and the appended claims.

DESCRIPTION OF THE PREFERRED EMBODIMENTS

Figure 2:
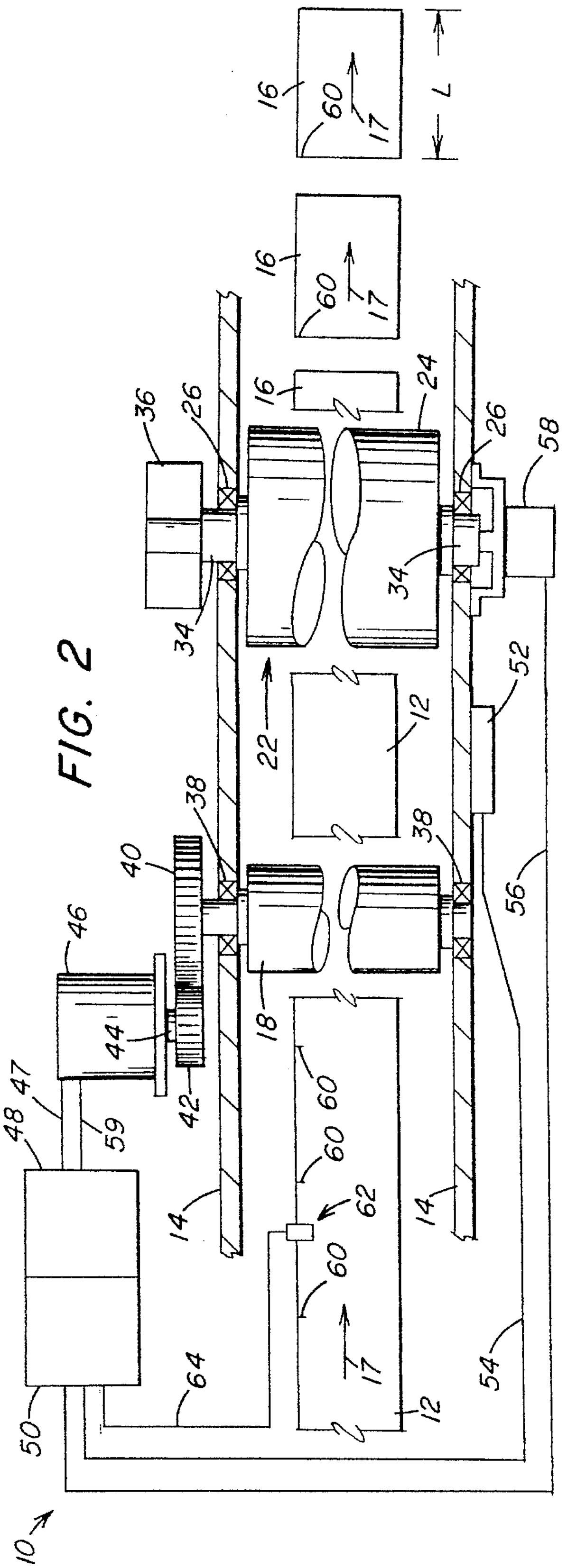
FIG. 2 is a top plan view of the envelope machine shown in FIG. 1.
Figure 1:
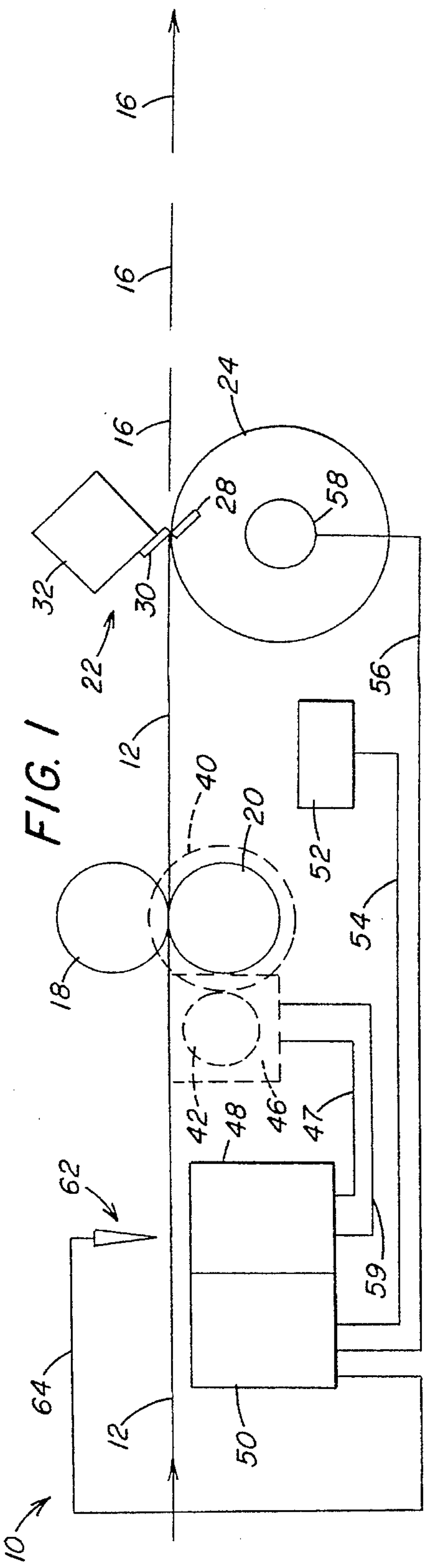
FIG. 1 is a schematic view in side elevation of an envelope machine, illustrating apparatus for adjusting and controlling the length of envelope blanks cut from a web of sheet material.

Referring to FIGS. 1 and 2, there is illustrated in an envelope blank forming machine a web cutting station generally designated by the numeral 10 that is positioned, for example, between an envelope blank gumming and folding station (not shown) and a supply reel or roll (not shown) of a continuous web 12 of paper. The web cutting station 10 is mounted in a frame 14 of the envelope machine as are the envelope blank gumming and folding station and the supply roll. Individual envelope blanks 16 of a preselected length L are cut from the web 12 at the station 10 and are conveyed therefrom in the direction indicated by arrow 17 to the adjacent envelope blank gumming and folding section. As well known in the art, at the envelope blank gumming and folding section, adhesive material is applied to selected margins of the envelope blanks, and the envelope blanks are folded to form an envelope as known in the art.

The continuous web material 12 is unwound at a preselected linear speed from the web supply roll by a pair of pull rolls 18 and 20. The pull rolls 18 and 20 are rotatably journaled in overlying relation in the machine frame 14. The continuous web 12 of material passes between the rolls 18 and 20 which frictionally engage and exert tension on the web 12. A selected one of the rolls, for example, roll 20 is rotated at preselected speed in accordance with the present invention to generate a selected linear feed rate of the web 12 corresponding to a preselected length L of blank to be cut from the web 12. The pull rolls 18 and 20 combine to pull the web material from the supply roll and feed the web 12 to a web cutting mechanism generally designated by the numeral 22.

The web cutting mechanism 22 includes a cylinder 24 rotatably supported by bearings 26 in the machine frame 14. The cylinder 24 includes a cutter knife 28 secured to the periphery of the cylinder 24 and extending parallel to the longitudinal axis thereof. The cutter knife 28 cooperates with a backing anvil 30 that is secured to an anvil holder 32. The anvil holder 32 is stationarily supported on the machine frame 14. The knife cylinder 24 includes a shaft 34 drivingly connected to a component 36 which is drivingly connected to a main drive shaft (not shown) of the envelope machine. The drive shaft of the envelope machine is driven at a preselected, fixed speed.

As the web 12 is fed by the pull rolls 18 and 20 to the web cutting mechanism 22, rotation of the cylinder 24 brings the knife 28 and anvil 30 into cooperating relationship to sever the web 12 at preselected intervals to form blanks 16 of a preselected length L as indicated in FIGS. 1 and 2.

The web material 12 is unwound from a roll by the pair of the pull rolls 18 and 20. The rolls 18 and 20 rotate at a speed to obtain a desired linear rate of feed of the web 12 to the web cutting mechanism 22 to obtain the desired cut length of blanks 16. By varying the rate of rotation of the pull rolls 18 and 20 relative to rotation of knife cylinder 24 for a constant rate of rotation of the main drive shaft, the rate of feed of the web 12 is varied to change the length of blank 16 cut from the web 12.

Both of the pull rolls 18 and 20 are rotatably supported by bearings 38 in the machine frame of 14. The pull rolls 18 and 20 are nonrotatably connected to a gear 40 that meshes with a gear 42 connected to an output shaft 44 of a servo-motor 46. The servo-motor 46 is electrically connected by conductor 47 to a servo drive 48 that is operated by a controller 50. The controller 50 is electrically operated by an operator controllable keypad 52 mounted on the machine frame 14. The keypad 52 is electrically connected to the controller 50 by conductor 54.

The keypad 52 and the controller 50 are microprocessor controlled and are thus programmed to receive input from the operator for setting the length of the blank 16 to be cut from the web. The machine operator numerically enters the length of the blank 16 to be cut from the web on the keypad 52. The keypad 52, in response to the input from the operator, generates a corresponding input signal representative of the desired feed length to the controller 50. The microprocessor of the controller 50 senses the input signal from the keypad 52 and converts the input signal to a responsive signal representative of the desired length of the envelope blank.

The controller 50 senses and receives an additional input signal through conductor 56 from an encoder 58 that is mechanically coupled to shaft 34 of the knife cylinder 24. With this arrangement, the encoder 58 is driven from the shaft 34 to generate an input signal that includes a number of pulses generated for each revolution of the cylinder 24. For example, the encoder generates a signal including 10,000 pulses per revolution of the cylinder 24. Thus, the pulsed signal from the encoder 58 is representative of the angular position of the cylinder 24 based on the number of pulses transmitted. Not only does the signal transmitted by the encoder 58 to the controller 50 indicate the number of pulses representative of the angular position of the cylinder 24, but also the pulses rate and any change in the pulse rate. Preferably, the knife cylinder 24 is rotated at a fixed speed from the main drive of the envelope machine; however, the speed may vary somewhat. Any variation is reflected in a rate of change of the pulsed signal from the encoder 58.

The controller 50 also senses and receives an input signal through conductor 59 transmitted by an encoder (not shown) coupled to the servo-motor 46. The input signal transmitted by the encoder of the motor 46 through conductor 59 to the controller 50 is representative of the rate of rotation of the pull rolls 18 and 20. Thus the controller 50 receives input signals from the keyboard 52 generated by the machine operator, a pulsed input signal from the encoder 54 representative of the angular position of the knife cylinder 24, and a input signal from the encoder of the servo-motor 46 representative of the rate of rotation of the pull rolls 18 and 20. The combined servo-motor 46 and servo-drive 48, controller 50 including microprocessor, keypad 52 and encoder 58 are commercially available devices and therefore will not be described in detail herein.

In operation, the desired length of the blank 16 cut from the web 12 is chosen by the operator and numerically entered on the keypad 52. In response to the input from the operator, the keypad 52 generates an input signal to the controller 50. The controller 50 compares the input signal from the keypad 52 with the input signal received from the encoder 58. As indicated, the input signal from the encoder 58 is a pulsed signal which is representative of the angular position of the knife cylinder 24 corresponding to the rate of rotation of the cylinder 24. The input signal from the keypad 52 is converted by the controller 50 to a signal representing the desired blank length L to be cut from the web 12. Accordingly, the blank length is determined by the feed rate of the web 12 to the web cutting mechanism 22.

The controller 50 converts the input signal from the keypad 52 and the encoder 58 to a ratio of the desired rate of rotation of the pull rolls 18 and 20 to the knife cylinder 24. In order for the controller 50 to actuate the servo-drive 48 to in turn operate the servo-motor 46 to rotate the pull rolls 18 and 20 at a preselected speed, the controller 50 must synchronize the rotation of the knife cylinder 24 with the rotation of the pull rolls 18 and 20 to obtain the desired linear feed rate corresponding to the selected blank length L.

Once the controller 50 determines the rate of rotation of the knife cylinder 24 by analyzing the pulsed signal from the encoder 58, the controller 50 determines the rate at which the pull rolls 18 and 20 must be rotated to generate the necessary feed rate of the web 12 so that upon rotation of the knife cylinder 24, the web is cut at specific intervals to obtain the desired length L of blank 16. The encoder associated with the servo-motor 46 transmits an input signal through conductor 59 to the controller 50 representative of the current rate of rotation of the pull rolls 18 and 20. From the input signal of the servo-motor encoder, controller 50 can then determine whether or not an adjustment needs to be made in the rate of rotation of the pull rolls 18 and 20 in response to the input signal received from the keypad 52.

The controller 50 compares the input signal from the encoder 58, the keypad 52 and the encoder of servo-motor 46 and generates a low voltage control signal to the servo-drive 48. In response to the low voltage signal from the controller 50, the servo-drive 48 generates a corresponding high voltage power signal through conductor 47 to the servo-motor 46. With this arrangement, the servo-motor 46 rotates the pull rolls 18 and 20 at a rate of speed for feeding the web 12 to the web cutting mechanism 22 to obtain a selected length L of blank 16.

Adjustments in the linear feed rate and corresponding blank length L can be made as the machine is operating. It is not necessary to interrupt operation of the pull rolls 18 and 20 to make adjustments in the linear feed rate. The controller 50 continuously receives the respective input signals so that in the event of a change in the rate of rotation of the knife cylinder 24 or a change in the rate of rotation of the pull rolls 18 and 20, an adjustment is made in the signal to the servo-motor 46 to maintain the desired linear feed rate for the selected length of blank 16. This arrangement constitutes a substantial improvement over the known devices for controlling the length of envelope blanks cut from the web that require change gears or variable speed transmissions.

With the present invention, adjustments in the linear feed rate are precisely made to generate an exact length of blank cut from the web. No trial and error efforts are required to determine if the adjustments in the linear feed rate produce the desired length of blank cut from the web. Further, by eliminating the need for gear sets and variable speed transmissions, substantial number of mechanical components are removed from the machine. As a result, the extent of machine maintenance normally required is substantially reduced. Consequently, accuracy and repeatability of the web cutting station 10 is maintained because mechanical components prone to wear are eliminated.

The web cutting station 10 illustrated in FIGS. 1 and 2 also includes the provision of cutting the web 12 at selected points thereon to obtain blanks 16 of the desired length L. This feature is utilized with pre-printed web material. With pre-printed web material, not only must the web be cut in a selected blank length but the web must be precisely cut at specific points on the web. For example, as illustrated in FIG. 2, the web 12 includes a plurality of registration marks 60 longitudinally spaced along one margin of the web 12. Accordingly, the web 12 is to be cut at the registration marks, and the registration marks are spaced a distance apart corresponding to the desired length L of the blank 16. The position of the registration marks 60 is detected by a sensor generally designated by the numeral 62 that is positioned above the web 12 as the web is fed from the roll by the pull rolls 18 and 20.

In one example, the sensor 62 is a high speed photoelectric sensor which is commercially available. The sensor 62 is operable to detect the registration marks 60 as the web 12 is unwound from the roll. In response to the detection of the marks 60, the sensor 62 generates a responsive input signal through conductor 64 to the controller 50. From the signal received from the sensor 62, the controller 50 must determine whether or not the registration marks 60 are in phase, based on the linear feed rate, with the position of the knife cylinder 24. In other words, the controller 50 must determine whether the registration marks 60 are early or late in relationship to rotation of the knife cylinder 24.

In addition, the controller 50 monitors the ratio of rotation of the knife cylinder 24 to the length of blank cut from the web. In other words, for every revolution of the knife cylinder 24 the length of blank cut from the web 12 must correspond to the length of web between registration marks 60. Because the web 12 is pre-printed with the registration marks 60 the distance between the marks may vary as a result of the printing operation. Accordingly, adjustments must be continually made to assure severing of the web 12 at the registration marks 60.

The controller 50 compares the input signal from the encoder 58 with the input signal received from the sensor 62. If the signal from the encoder 58 is synchronized with the signal from the sensor 62, then the registration marks 60 are in phase with the knife cylinder 24 to cut the blanks 16 at the registration marks 60 In the event, the respective signals from the encoder 58 and the sensor 62 are not synchronized, the controller 50 determines what correction is required to place the registration marks 60 in registration with the knife cylinder 24.

Based on the extent of deviation in synchronization of the respective signals from the encoder 58 and the sensor 62, the controller 50 generates a correction signal to the servo-drive 48. The correction signal actuates the servo-drive 48 to change the rate of rotation of the servo-motor 46 to adjust the rotational speed of the pull rolls 18 and 20 and effect the necessary phase correction of the web 12 to the cutting mechanism 22 for cutting the web 12 at the registration marks 60.

In the instance where the distance between registration marks 60 deviates plus or minus from a set distance, for example 10 inches, the deviation is detected by the sensor 62 and a corresponding adjustment signal is sent to the controller 50. The controller 50 responds by comparing the input signal from the sensor 62 with the input signal from the encoder 58. The controller 50 then transmits a correction signal to the servo-drive 48 which responsively actuates the servo-motor 46 to adjust the rate of rotation of the pull rolls 18 and 20. The rate of rotation is either increased or decreased corresponding to the deviation in the distance between the registration marks from the set distance. In this manner, the linear feed rate of the web 12 to the cutting mechanism 22 is adjusted so that the web 12 is fed at the speed required to sever the web 12 at the registration marks 60 regardless of the distance between the registration marks.

Figures 3, 4:
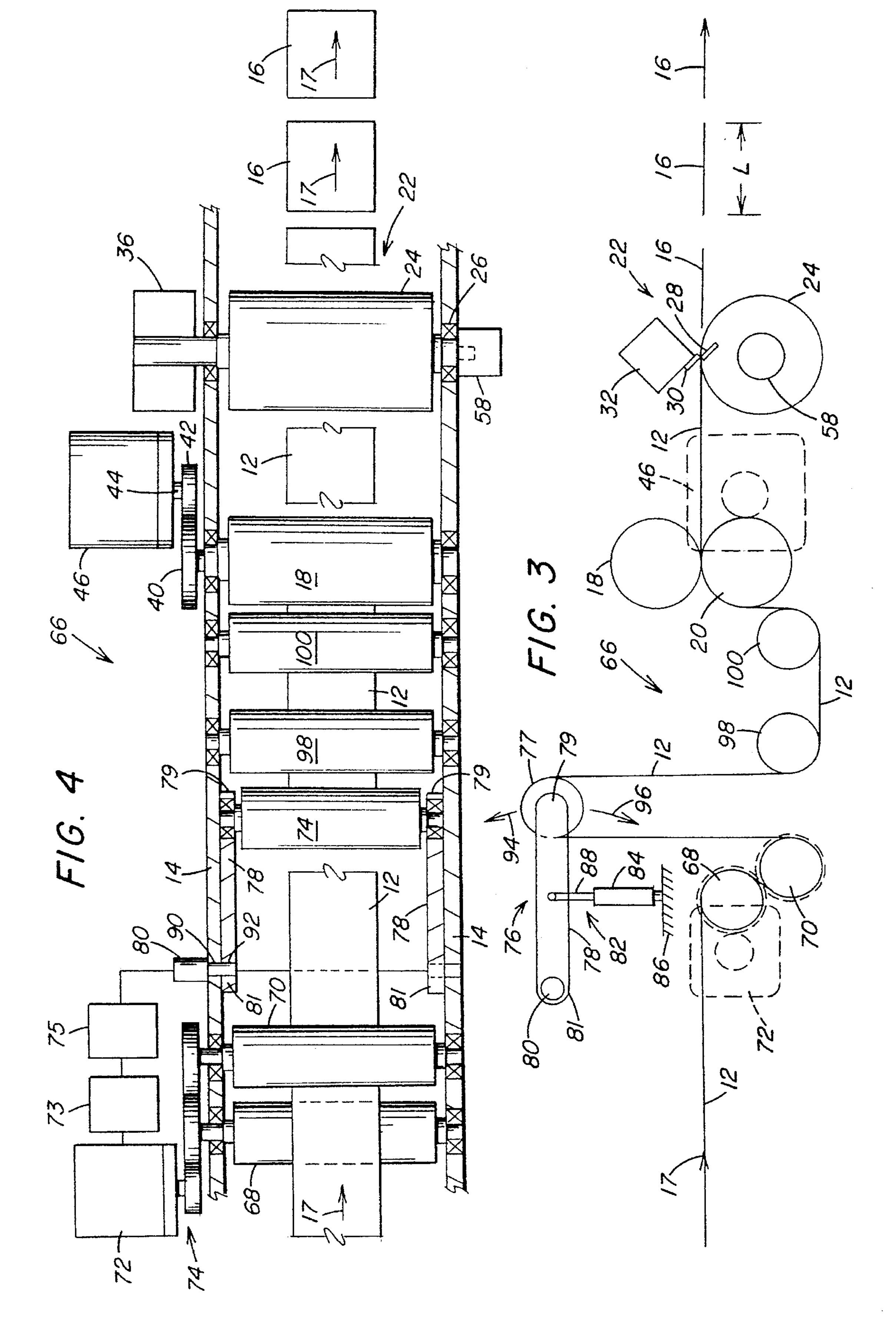
FIG. 3 is a schematic view similar to FIG. 1, illustrating apparatus for maintaining a constant tension on the web fed from the roll in response to changes in the feed rate when adjustments are made in the length of the blanks cut from the web.
FIG. 4 is a top plan view of the envelope machine shown in FIG. 3.

Now referring to FIGS. 3 and 4, there is illustrated a further embodiment of the present invention which maintains a preselected tension on the web as it is unwound from a roll and in response to changes in the linear feed rate of the web 12. A web cutting station 66 is illustrated in FIGS. 3 and 4 and includes many of the same elements above-described with respect to the web cutting station 10 illustrated in FIGS. 1 and 2. Accordingly, like elements illustrated in FIGS. 1 and 2 are designated by like elements shown in FIGS. 3 and 4.

As with the arrangement illustrated in FIGS. 1 and 2, the pull rolls 18 and 20 advance the web 12 at a preselected linear feed rate to the web cutting mechanism 22. The web 12 is thereby cut at selected intervals to form blanks 16 having a selected length L. The pull roll 20 is rotated at a preselected speed as determined by the input from the keypad to the controller as above described with respect to the embodiment shown in FIGS. 1 and 2. The keypad and controller are not shown in the embodiment illustrated in FIGS. 3 and 4, but it should be understood that the same mechanism for controlling the operation of the servo-motor 46 in the prior embodiment is also utilized with the embodiment shown in FIGS. 3 and 4 and therefore is incorporated herein by reference.

In addition, a pair of secondary pull rolls 68 and 70 are rotatably mounted in the machine frame 14 and positioned upstream of the primary pull rolls 18 and 20. The secondary pull rolls 68 and 70 are rotated at a preselected speed by a DC motor 72 which is drivingly connected through a gear train generally designated by numeral 74 to the pull rolls 68 and 70. The DC motor 72 is actuated by a DC drive 73 which is, in turn, controlled by a controller 75 similar to control of servo-motor 46 by servo-drive 48 and controller 50 described above and illustrated in FIGS. 1 and 2.

The pull rolls 68 and 70 are rotatably supported in the machine frame 14 and are positioned in overlying laterally displaced relation so as to permit the web 12 to extend over and around the upper pull roll 68 and then down and around the lower pull roll 70. From the pull rolls 68 and 70, the web 12 is advanced at a selected linear feed rate vertically over an idler roll 77 that is rotatably mounted on the end of a dancer assembly generally designated by the numeral 76.

The dancer assembly 76 includes a pair of arms forming a frame 78 having the idler roll 77 at one end portion 79 and a potentiometer 80 at an opposite end portion 81 of the frame 78 which is pivotally connected to the machine frame 14. The frame 78 is connected intermediately to a piston cylinder assembly generally designated by the numeral 82. The assembly 82 includes a cylinder portion 84 supported by machine frame portion 86 and an extensible piston rod 88 connected at its upper end to an intermediate point on the frame 78. The piston rod 88 is subjected to a preselected air pressure, controlled by a pressure regulator, to exert a preselected force on the frame 78. Accordingly, the web tension can be changed by increasing or decreasing the pressure on piston rod 88.

The potentiometer 80 is attached to the machine frame 14 and includes a shaft 90 suitably coupled to a shaft 92 mounted on the dancer assembly frame 78. The potentiometer 80 is electrically connected to the controller 75 of DC motor 72. Upon pivotal movement of the dancer assembly frame 78 the potentiometer 80 generates an output signal. The voltage of the output signal increases or decreases depending upon the upward or downward movement of the potentiometer 80 and associated shaft 92 corresponding to the upward or downward movement of the idler roller 77 in the direction of arrows 94 or 96. Thus, as determined by the direction of movement of the shaft 92, the potentiometer 80 transmits an input signal to the DC controller 75 which, in turn, actuates the DC drive 73 to adjust the output of the DC motor 72 to effect a change in the speed of rotation of the pull rolls 68 and 70.

From the idler roll 77 the web 12 of material extends around idler rolls 98 and 100 which are also rotatably supported in the machine frame 14. From the idler rolls 98 and 100, the web 12 is fed through the pull rolls 18 and 20 to the web cutting mechanism 22 as discussed above with respect to the embodiment shown in FIGS. 1 and 2.

By adjusting the air pressure applied to the piston rod 88 extending from the cylinder 84, the dancer assembly frame 78 is pivoted on the machine frame 14 to position the idler roll 77 in a preselected position for exerting a desired tension on the web 12. Accordingly, the web tension can be changed by adjusting the force applied to the piston rod 88 in the cylinder 84.

The rate of rotation of the secondary pull rolls 68 and 70 must be synchronized with the rate of rotation of the pull rolls 18 and 20. The DC motor 72 drives the secondary pull rolls 68 and 70 and is electrically operated by the DC controller 75. Accordingly, when the speed of the servo-motor 46 is changed, the speed of the DC motor 72 must be changed. The controller 75, therefore, responds to a change in the speed of the servo-motor 46 to adjust the rate of rotation of the DC motor 72, and the rate at which the secondary pull rolls 68 and 70 are rotated.

In the event, the DC motor 72 should rotate the pull rolls 68 and 70 at a speed that results in overfeeding of the web 12 to the idler roll 77 on the dancer assembly 78, the dancer assembly frame 78 pivots upwardly in the direction of arrow 94. Consequently, the potentiometer shaft 92 moves downwardly on the opposite end 81 of the frame 78 and thereby changes the position of the potentiometer 80 to decrease or trim the voltage of the signal transmitted to the DC motor 72 to reduce the speed of the motor and thereby decrease the linear feed rate. The speed of the DC motor 72, however, is principally determined by operation of the DC drive 73 through controller 75. Decreasing the linear feed rate of the web 12 results in downward movement of the frame 78 in the direction of arrow 96 to substantially the midpoint position of travel shown in FIG. 3. Correspondingly, as the dancer assembly frame 78 is drawn further downwardly at the end 79 by the tension of the web 12, the speed of the DC motor 72 increases relative to the speed of the servo-motor 46 on the main pull rolls 18 and 20 and more paper is pulled from the web supply roll.

In the event the web 12 is underfed by the secondary pull rolls 68 and 70, the dancer assembly frame 78 responds by pivoting downwardly in the direction of arrow 96. Consequently, the potentiometer 80 responds by increasing the voltage of the signal transmitted to the DC controller. The DC drive 73 responds to accelerate the speed of motor 72 to increase the rate of rotation of the pull rolls 68 and 70 and allows the frame 78 to pivot to the pre-set position.

The potentiometer 80 responds constantly to the relative movement of the frame 68 in response to the tension applied to the web 12. In this manner, the tension in the web 12 is substantially maintained constant. Under equilibrium conditions, the tension in the web 12 is proportional to the force applied by the piston cylinder assembly 82 to the frame 78. The piston cylinder assembly maintains a constant force on the dancer assembly 76, which force may be adjusted to adjust the present tension in the web 12. In the event the pull rolls 68 and 70 unwind the web from the roll resulting in a change in the tension of the web 12, a correction signal is transmitted to the DC controller 75 to adjust the rate of rotation of the rolls 68 and 70 so that the tension in the web 12 is restored to the desired level. The above described arrangement for maintaining a relatively constant tension on the web 12 can be positioned at any point on the envelope machine where it is desired to control the tension in the web at a specific zone or area of the machine.

Figure 5:
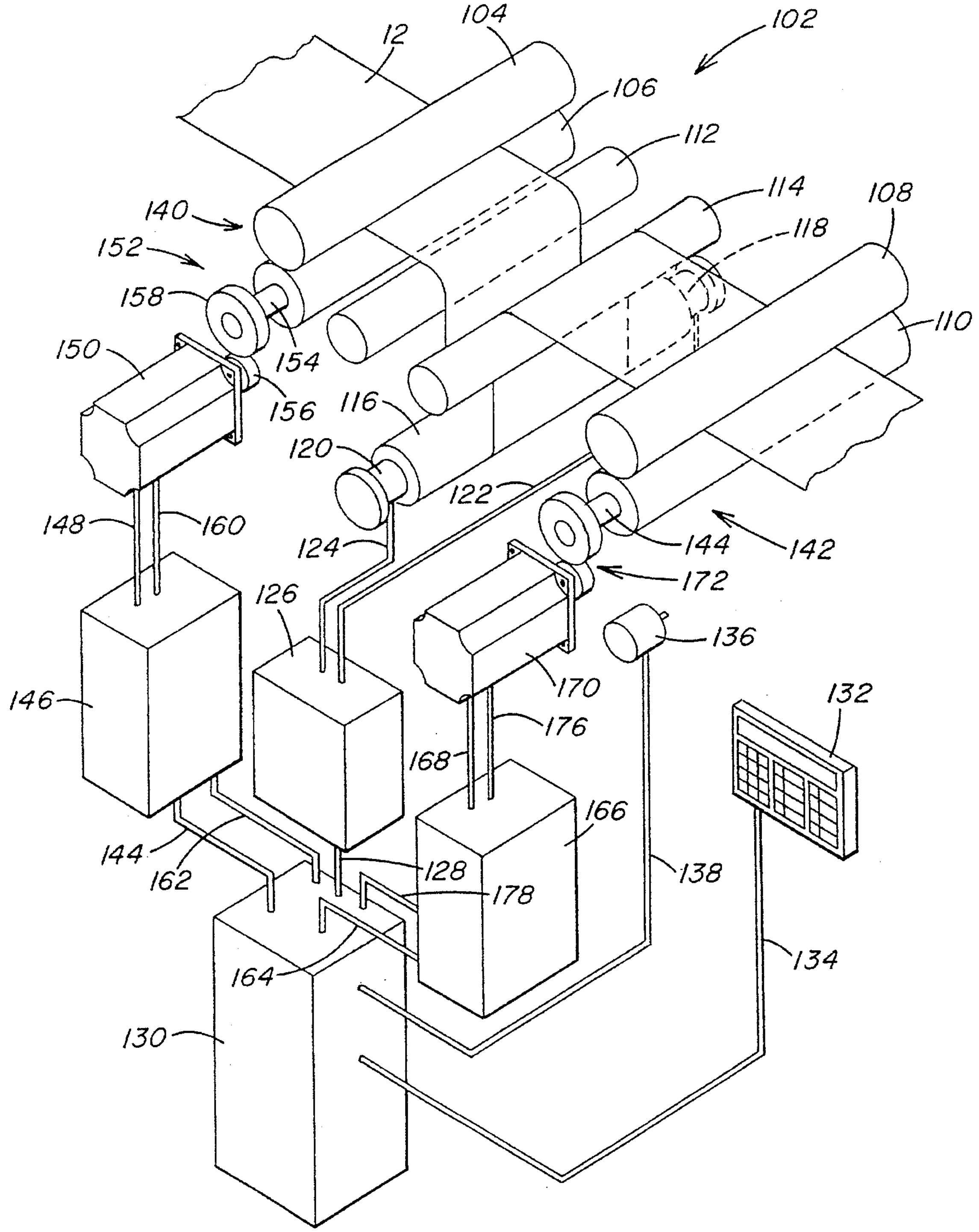
FIG. 5 is a schematic view of another embodiment of apparatus for maintaining a preselected tension on the web in response to changes in the web feed rate.

Referring to FIG. 5, there is illustrated another embodiment of the present invention for maintaining a desired tension on the web 12 of sheet material in a tension zone generally designated by the numeral 102 as the web 12 is fed in a sheet feeding operation, for example, to the web cutting mechanism 22 illustrated in FIGS. 1 and 2. It should be understood that the web cutting mechanism 22 described above is utilized with the web feed and tension control apparatus shown in FIG. 5. The web cutting mechanism 22 illustrated in FIGS. 1 and 2 is positioned downstream of the tension zone 102 shown in FIG. 5.

It should be understood that the web tension control device shown in FIG. 5 is applicable to any sheet feeding operation where it is desired to maintain a preselected tension on a web of sheet material moving in a feed line and to adjust the web tension automatically in response to a change in the sheet feed rate. Accordingly, the device shown in FIG. 5 is not limited to a sheet feeding operation in an envelope blank forming machine.

In accordance with the embodiment shown in FIG. 5, the tension applied to the web 12 is controlled or maintained at a preselected magnitude within the tension zone 102. The tension zone 102 is defined by a first pair of pull or feed rolls 104 and 106 that frictionally engage the surface of the web 12 between the nip formed between the rolls 104 and 106. Positioned downstream of the pair of pull rolls 104 and 106 a preselected distance is a second pair of pull or feed rolls 108 and 110. The rolls 108 and 110 also frictionally engaging the surface of the web 12 at the nip between the pull rolls 108 and 110. Each of the pair of pull rolls 104, 106 and 108, 110 is rotated at a preselected rate or position in relation to rotation of the main drive shaft of the machine.

The pairs of rolls 104, 106 and 108, 110 being in spaced relation, define a tension zone 102. The tension applied to the web 12 in the zone 102 is different from the tension in the web 12 upstream of the pair of pull rolls 104 and 106. The web 12 is also supported within the tension zone 102 by a pair of parallel spaced idler rolls 112 and 114 and a third idler roll 116 positioned between and below the idler rolls 112 and 114. With this arrangement, the continuous web of sheet material is fed in a feed line through the nip between the pair of pull rolls 104 and 106 extends in overlying contact with the idler roll 112 and extends around and in contact with the idler roll 116 and therefrom upwardly into overlying relation with the idler roll 114. From the idler roll 114 the web 12 is fed in the tension zone 102 through the nip formed by the second pair of pull rolls 108 and 110. As above indicated from the second pair of pull rolls 108 and 110, the continuous web of material is fed to the web cutting mechanism 22 illustrated in FIGS. 1 and 2.

As will be explained later in greater detail, the pairs of pull rolls 104, 106 and 108, 110 are rotated in relation to rotation of the main drive shaft of the envelope machine. Rotation of the pull rolls applies a tension to the web 12 in the tension zone 102. The tensioned web 102 applies a force to the idler rolls 112, 114 and 116. The force applied to the idler roll 116 is detected or sensed by load cells 118 and 120 mounted on opposite ends of the idler roll 116. The load cells 118 and 120 sense the force applied to the idler roll 116 by the tension in the web 12 and generate a voltage output signal through conductors 122 and 124 to a load cell signal conditioning device 126. The voltage signals transmitted from each of the load cells 118 and 120 are summed together and amplified by the conditioning device 126 to produce a resultant output signal which is proportional to the measured tension of the web 12 in the tension zone 102. For example, the output signal from the conditioning device 126 is in the range between about 0 to 10 volts DC for a web tension in the range between about 0 to 50 pounds.

The output signal from the signal conditioning device 126 is transmitted through a conductor 128 to a motion controller 130. The motion controller 130 is also a commercially available device similar to the controllers 50 and 75 illustrated in FIGS. 1, 2 and 4 and described above. The motion controller 130 closes the "position loop" and/or "velocity loop" for the drive to the pairs of pull rolls 104, 106 and 108, 110. The motion controller 130 receives input signals from an operator controllable interface or keypad 132, similar to the keypad 52 described above and illustrated in FIGS. 1 and 2, through conductor 134.

The keypad 132 and the motion controller 130 are microprocessor controlled and programmed to receive input signals from the keypad 132 entered by the machine operator for setting the tension on the web 12 in the tension zone 102. For example, in the event the operator selects a tension of 25 pounds to be applied to the web 12 in the zone 102, this value is digitally entered on the keypad 132. A corresponding signal is transmitted from the keypad 132 through the conductor 134 to the controller 130. The controller 130 then converts the input signal from the keypad 132 representative of the desired tension to be applied to the web 12 to a value which is processed through a PID (proportional/integral/derivative) control of the controller 130. The output from the PID is used to increase or decrease the velocities of a selected one of the pull roll pairs, if a discrepancy exits between the actual tension on the web 12 in the zone 102 and the desired tension selected by the operator.

In addition to receiving input for setting the desired tension in the web 12 through the keypad 132, the motion controller 130 also receives input signals from a master position encoder 136 through conductor 138. In a manner similar to the operation of the encoder 58 described above and illustrated FIGS. 1 and 2, the encoder 136 is suitably connected, such as optically coupled, to the main drive shaft of the envelope machine. Thus, the encoder 136 transmits a pulsed signal representative of the angular position of the main drive shaft to the controller 130.

As also discussed above, the various operations performed by the envelope machine, such as window cutting, profile cutting, flap folding, etc., are synchronized with each revolution of the main drive shaft. Preferably, for each revolution of the main drive shaft one product length is cut from the web. As further described above, operator input to the controller sets the desired blank length to be cut from the web and for a fixed rate of rotation of the main drive shaft the feed rate of the web 12 to the cutting mechanism 22 is adjusted by analyzing the pulsed signal from the encoder 136. The motion controller 130 determines the rate at which a selected one of the pairs of pull rolls 104, 106 or 108, 110 must be rotated to generate the necessary feed rate of the web 12 so that the web is cut at specific intervals to obtain the desired length of blank. The operator input to the motion controller 130 is converted to an electronic gear ratio request. Based on the selected length of blank to be cut from the web, the motion controller 130 calculates and maintains a specific feed rate for a desired length of cut based on the position and velocity of the rotating main drive shaft.

The motion controller 130 controls the rotational velocities of the pairs of pull rolls 104, 106 and 108, 110. A selected one of the pull roll pairs rotates at a preselected velocity to feed a preselected length of web material to the cutting mechanism 22 for each revolution of the main drive shaft and are designated the feed rolls. The other pair of pull rolls are rotated at a preselected velocity controlled by the motion controller 130 in response to the tension to be applied to the web 12 in the zone 102 as commanded by the operator through the keypad 132. Therefore, the pair of pull rolls that control the tension applied to the web 12 are referred to as the tension rolls.

As with the tension device illustrated in FIGS. 3 and 4, under equilibrium conditions the pairs of pull rolls 104, 106 and 108, 110 are rotated at a slight differential velocity. In one example, the pair of pull rolls 104, 106 function as feed rolls generally designated by the number 140, and the pair of pull rolls 108, 110 function as the tension rolls generally designated by the numeral 142. However, it should be understood that the pairs of rolls 104, 106 and 108, 110 may function either as the feed rolls or the tension rolls.

As above discussed, the rotation of the feed rolls 140 relative to rotation of the machine main drive shaft determines the length of sheet material fed to the cutter mechanism 22 for each revolution of the knife cylinder 24. Once the length of blank to be cut from the web is selected and is inputted to the controller 130, as above described for the embodiment shown in FIGS. 1 and 2, the motion controller 130 responds to the operator input for transmitting an input signal through conductor 144 to a servo-amplifier 146. The servo-amplifier 146 converts the input signal from the motion controller 130 to a representative output signal transmitted by conductor 148 to a servo-motor 150.

The servo-motor 150 includes an output shaft drivingly connected by a drive mechanism generally designated by the numeral 152 to an output shaft 154 of the pull roll 106. The drive mechanism 152 includes in one embodiment a pair of meshing reduction gears 156 and 158. The reduction drive mechanism 152 may also include a combination of timing belts and gears drivingly connecting the output shaft of the servo-motor 150 and the pull roll shaft 154.

Once the motor 150 is commanded by the motion controller 130 to rotate the feed rolls 140 at a preselected rate, the feed rate is monitored by the motion controller 130 by transmission of an output signal from the motor 150 through the conductor 160 to the servo-amplifier 146 and therefrom through the conductor 162 to the motion controller 130. In this manner, a feedback signal representative of the rotation of the pull roll 106 is transmitted to the motion controller 130 so that the motion controller can monitor the operation of the feed rolls 140 to maintain the desired rate of feed to the cutter mechanism based on the position of the main drive shaft and the length of blank to be cut from the web.

The apparatus for controlling the rate of rotation of the tension rolls 142 is identical to that described above for the feed rolls 140. Therefore, either set of pull rolls 104, 106 or 108, 110 may be used as the feed rolls 140 and the tension rolls 142.

In response to the tension setting entered by the operator through the keypad 132, the motion controller 130 transmits an output signal through conductor 164 to a servo-amplifier 166 which, in turn, transmits a responsive output signal through conductor 168 to servo-motor 170. The servo-motor 170 also includes an output shaft connected through a reduction drive mechanism generally designated by the numeral 172 to an output shaft 174 of the pull roll 110. Accordingly, the rotation of the pull roll 110 is monitored by the motion controller 130 by a signal transmitted from the motor 170 through conductor 176 to the servo-amplifier 166 and therefrom through conductor 178 to the motion controller 130.

The feed rolls 140 and the tension rolls 142 are initially driven at the same electronic gear ratio. However, the gear ratios will differ in the event the rotational speed of the tension rolls 142 is adjusted to match the measured or actual tension of the web 12 in the tension zone 102 with the commanded tension as entered by the operator through the keypad 132. In this instance, the feed rolls 140 and the tension rolls 142 operate at different gear ratios so that the web within the tension zone 102 is slightly stretched but is not broken. Web material is continuously fed to the tension zone 102 through the first pair of pull rolls 104, 106. Therefore, the differential in gear ratios between the feed rolls 140 and the tension rolls 142 does not result in severing the web 12.

In operation a differential in commanded tension and measured tension of the web is detected by the motion controller 130 through a comparison of the value of the tension entered by the operator at the keypad 132 and the voltage value received by the load cell signal conditioning device 126 from the load cells 118 and 120. The input signal from the conditioning device 126 is converted by the motion controller to a digital value which is then compared with the equivalent signal received from the operator keypad 132. In one example, if the load cells 118 and 120 and the conditioning device 126 are calibrated to produce a signal in the range between about 0 to 10 volts DC corresponding to a tension in the range between about 0 to 50 pounds, a tension of 25 pounds applied to the web 12 in the tension zone 102 produces a 5 volt DC signal transmitted to the motion controller 130. This signal is processed by analog to digital conversion by the motion controller 130. The two signals are compared and in this example where the measured signal is the same as the commanded signal no action is initiated by the controller 130 regarding a modification to the electronic gear ratio for rotating the tension rolls 142.

In the event a discrepancy exists between the signal received from the conditioning device 126 and the signal received from the operator keypad 132, the motion controller 130 utilizes the PID control to adjust electronically the gear ratio of the tension rolls 142 to, in turn, adjust the rotation of the pull rolls 108 and 110 so that they rotate a certain angular distance relative to one complete revolution of the main drive shaft. In other words, the rotation of the pull rolls is controlled in relation to the angular position of the knife cylinder 24 driven by the main drive shaft.

Increasing the electronic gear ratio of the pull rolls 108, 110 as the tension rolls 142 increases the web tension in the zone 102. On the other hand, if the pull rolls 104, 106 are utilized as the tension rolls increasing the electronic gear ratios for the rolls 104, 106 decreases the web tension in the zone 102. Preferably, adjustments to the electronic gear ratio for the tension rolls 142 is limited to plus or minus 1%. This is to eliminate the possibility of a "runaway" ratio increase in the event of a web break.

In a further embodiment of the tension control device of the present invention, the electronic gear ratio difference is entered directly at the operator keypad 132 in the form of a draw percentage. With this arrangement, the actual tension in the tension zone 102 as measured by the load cells 118 and 120 is disregarded, and the electronic gear ratio for the tension rolls 142 is modified by a multiplication factor. The multiplication factor is either greater or less than 1 depending upon whether the pull rolls 108, 110 are the tension rolls or the pull rolls 104, 106 are the tension rolls.

In a further embodiment of the present invention, the servo-amplifier for operating the pair of pull rolls that is used as the tension rolls 142 is operated in a torque mode instead of a position mode, as described above. With this arrangement, the feed rolls 140 are rotated at a preselected rate corresponding to a preselected length of blank to be cut from the web. On the other hand, the tension rolls 142 are actuated to rotate at a preselected torque. With the AC brush-less servo-motors 150 and 170 of the present invention, torque is supplied independent of rpm very accurately even to low rpm values. However, the requested torque generated at the motor shaft and drive line friction and other losses affect the actual web tension value which can be overcome by operating the system in a "closed loop" via load cell feedback. Also, in order to prevent rotating the motor shaft at a maximum rpm when no web is present to work against the torque, the velocity of the tension rolls is limited to deviate from the velocity of the feed rolls by a small percentage difference. In the alternative when the differential between the velocity of the tension rolls and the feed rolls exceeds a preselected limit, rotation of the tension rolls and feed rolls is interrupted.

According to the provisions of the patent statutes, we have explained the principle, preferred construction, and mode of operation of our invention and have illustrated and described what we now consider to represent its best embodiments. However, it should be understood that, within the scope of the appended claims, the invention may be practiced otherwise than as specifically illustrated and described herein.

We claim:

1. Apparatus for controlling the tension in a web advancing in a feed path comprising, a machine frame supporting the web for movement in the feed path, a first pair of pull rolls rotatably supported in said machine frame for engaging the web, a first drive means for rotating said first pair of pull rolls to advance the web in the feed path, a second pair of pull rolls rotatably supported in spaced relation to said first pair of pull rolls in said machine frame for engaging the web in a tension zone of the web extending between said first and second pair of pull rolls, second drive means for rotating said second pair of pull rolls to apply tension on the web between said first and second drive means, a motion controller electrically connected to transmit and receive signals to and from said first and second drive means for adjusting the relative rotation of said first and second pairs of pull rolls upstream and downstream of the tension zone to generate a preselected feed rate of the web and a preselected tension in the web, means for sensing the tension applied to the web in the tension zone between said first and second drive means and generating to said motor controller an input signal representative of the tension, operator means electrically connected to said motion controller for transmitting an input signal to said motion controller corresponding to an operator selected tension to be applied to the web in the tension zone between said first and second drive means, and said motion controller being responsive to the input signal received from said operator means to compare the input signals received from said sensing means with the input signal received from said operator means to generate an output signal to a selected one of said first and second drive means to rotate a selected one of said first and second pull rolls at a preselected rate so that the tension applied to the web corresponds to the operator selected tension.

2. Apparatus for controlling the tension in a web advancing in a feed path as set forth in claim 1 in which, said second pair of pull rolls operates as a feed roll to advance the web at a preselected rate for severing from the web blanks of a preselected length.

3. Apparatus for controlling the tension in a web advancing in a feed path as set forth in claim 1 in which, said first pair of pull rolls operates as a tension roll to exert a preselected tension on the web advancing in the tension zone between said first and second pairs of feed rolls.

4. Apparatus for controlling the tension in a web advancing in a feed path as set forth in claim 1 in which, a selected one of said first and second pairs of pull rolls are rotated to exert a preselected tension on the web in the tension zone independent of the rate of feed of the web through the tension zone.

5. Apparatus for controlling the tension in a web advancing in a feed path as set forth in claim 1 in which, said means for sensing the tension applied to the web includes an idler roller supporting the web between said first and second pairs of pull rolls, load cell means mounted on said idler roller for converting the force exerted on the idler roll by the tension in the web to a responsive output signal, and means electrically connecting said load cell means to said motion controller for receiving said output signal from said load cell means for comparison with said input signal from said operator means to determine if the tension applied to the web corresponds to the operator selected tension.

6. Apparatus for controlling the tension in a web advancing in a feed path as set forth in claim 1 which includes, a master position encoder electrically connected to said motion controller for actuating said controller to rotate said first drive means to feed a preselected length of the web for each revolution of said first pair of pull rolls and rotate said second drive means for tensioning the web upon rotation of said second pair of pull rolls in response to the preselected feed length of the web material.

7. A method for controlling the tension in an advancing web comprising the steps of, supporting the web for movement in a feed path, engaging the web between a first pair of pull rolls in the feed path at a preselected feed rate, rotating the first pair of pull rolls to advance the web in the feed path at a preselected feed rate, engaging the web between a second pair of pull rolls spaced from the first pair of pull rolls in the feed path, forming a tension zone of the web in the feed path between the first and second pairs of pull rolls, rotating the second pair of pull rolls to apply tension on the web in the tension zone independently of the feed rate of the web, sensing the tension applied to the web in the tension zone between the first and second pairs of pull rolls, selecting a tension to be applied to the web in the tension zone between the first and second pairs of pull rolls, comparing the tension applied to the web in the feed path with the selected tension to be applied to the web, and adjusting the rotation of a selected one of the first and second pairs of feed rolls upstream and downstream of the tension zone so that the tension applied to the web corresponds to the selected tension to be applied to the web.

8. A method as set forth in claim 7 which includes, adjusting the rotation of the first pair of feed rolls to change the length of the web advanced in the feed path for each revolution of the first pair of feed rolls, and adjusting the rotation of the second pair of feed rolls in response to the change in the length of the web advanced in the feed path to maintain a selected tension in the web.

9. A method as set forth in claim 7 which includes, automatically adjusting the tension applied to the web between the first and second pairs of pull rolls in response to a change in the rate of feed of the web in the feed path.

10. A method as set forth in claim 7 which includes, detecting a discrepancy between the tension applied to the web with the tension selected remotely by an operator for a selected rate of feed of the web, and adjusting rotation of the second pair of pull rolls to apply the desired tension to the web for the selected rate of feed of the web.

* * * * *